Patented Feb. 20, 1934

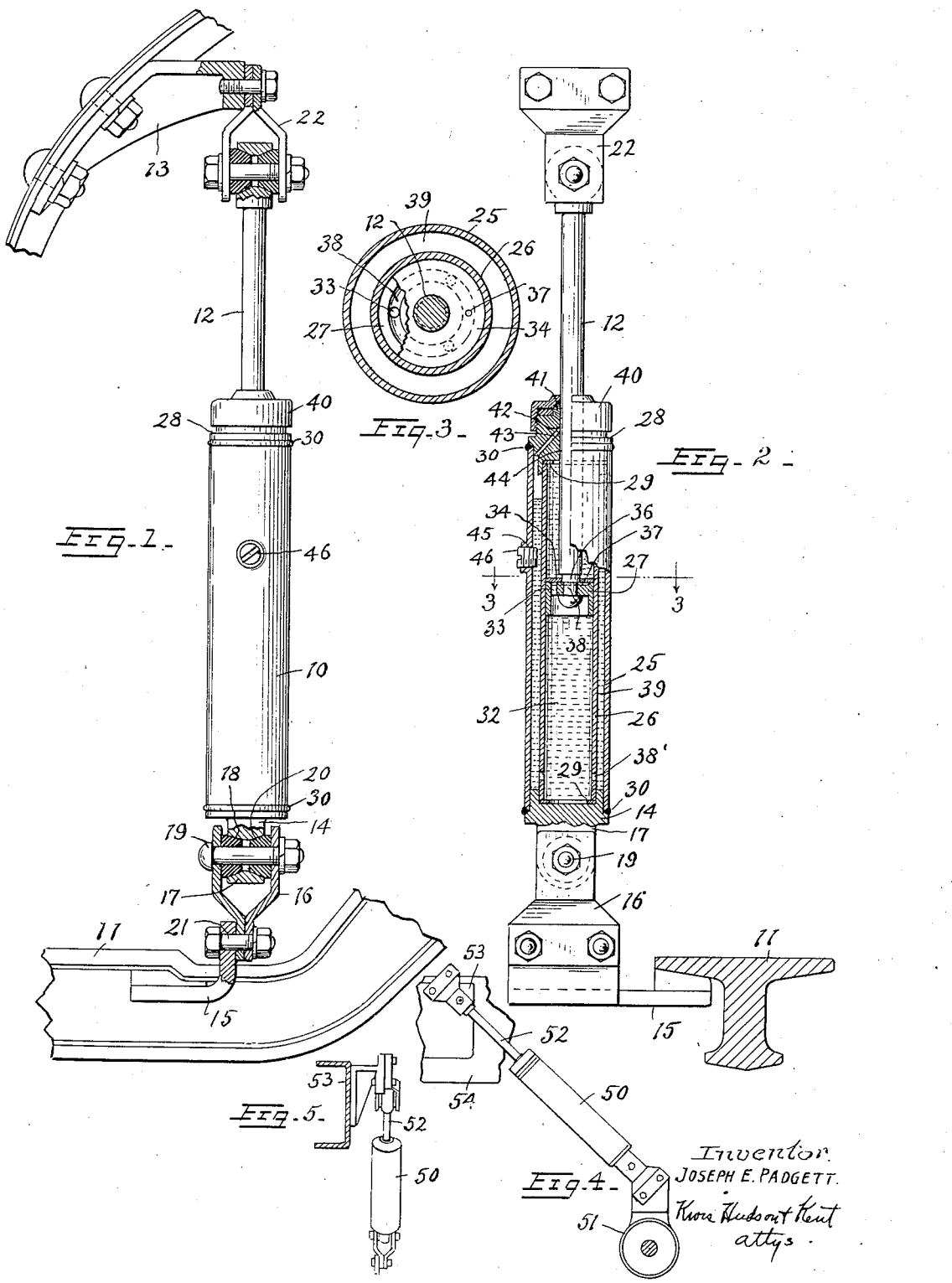

1,948,185

UNITED STATES PATENT OFFICE 1,948,135

SHOCK ABSORBER

Joseph E. Padgett, Toledo, Ohio

Application November 16, 1931, Serial No. 575,267
Renewed October 2, 1933

10 Claims. (Cl. 188—88)

This invention relates generally to shock absorbing devices for motor vehicles and the like, and more particularly to a shock absorber of the fluid displacement type.

An object of the present invention is to provide an improved shock absorber of the type referred to, which is very efficient and reliable in operation, and which is adapted for direct connection without the intermediary of the laterally extending arm heretofore employed.

Another object of this invention is to provide a shock absorber of the type referred to, wherein a reservoir associated with the working cylinder is adapted to function as a displacement chamber and to contain a replenishing supply of liquid.

Another object of this invention is to provide a direct acting shock absorber of the fluid displacement type, embodying novel means for preventing the loss of fluid by leakage.

A further object of this invention is to provide a shock absorber of the type referred to embodying novel means for removing gas from the working cylinder during the operation of the device.

Still another object of this invention is to provide a shock absorber of the fluid displacement type, embodying a novel form of plunger.

Other objects and advantages of this invention will be apparent from the following description, when taken in conjunction with the accompanying sheet of drawing, wherein, Fig. 1 is an elevational view showing my shock absorber applied to the chassis of a motor vehicle.

Fig. 2 is another elevational view thereof showing parts of the device in section.

Fig. 3 is a transverse sectional view taken substantially on line 3—3 of Fig. 2.

Fig. 4 is an elevational view illustrating another manner of applying my shock absorbing device to the chassis of a motor vehicle, and Fig. 5 is another elevational view of the same mounting.

For a more complete disclosure of my invention, detailed reference will now be made to the accompanying drawing, wherein I have illustrated a shock absorber of the fluid displacement type. The shock absorber shown in this instance represents my preferred embodiment, but it should be understood, however, that the principles of my invention may be incorporated in various other constructions and arrangements.

As illustrated in the drawing, my shock absorbing device is of the direct acting type, that is to say, the cooperating moving parts are directly connected, respectively, to sprung and unsprung portions of a vehicle chassis without the use of a laterally extending lever arm. Direct acting shock absorbers are not now new, but these devices as heretofore constructed have been generally inefficient and unreliable in operation, principally because of the difficulty in preventing the leakage of fluid from the working cylinder. According to my invention, as will be hereinafter explained in detail, I have provided an improved construction for a direct acting shock absorber, wherein the danger of fluid leakage is eliminated, and wherein a reservoir disposed around the working cylinder is adapted to function as a displacement chamber and also to replenish the supply of fluid in the working cylinder. It is also characteristic of my shock absorber, that during the operation of the device, gas is discharged from the working cylinder and replaced by liquid, so that the tendency toward an emulsification of the liquid in the working cylinder is reduced to a minimum.

In its preferred embodiment, as illustrated in the drawing, my shock absorber comprises, in general, a casing 10, which is connected at one end thereof with a portion of the vehicle chassis, such as the axle 11, and a plunger-carrying rod 12 which extends into the casing and is connected to a spring-supported portion of the vehicle chassis, such as the anchor clip 13.

The casing 10 may be connected to the axle 11 by any suitable means, such as the arrangement shown in Figs. 1 and 2, wherein the casing is provided at its lower end with a closure plug 14 which is connected to the axle clip 15 by means of a bracket 16. In this arrangement the plug 14 is preferably formed with a tongue portion 17 having oppositely tapered communicating recesses 18 formed therein. A pivot pin 19, which is carried by the bracket 16, extends through the tongue 17 with tapered rubber bushings 20 mounted thereon for engagement with the tapered recesses 18. The bracket 16 may be connected to an anchor clip 15 by any suitable means, such as the bolt 21, and the clip 15, in turn, connected with the axle by welding or in any other appropriate way. The upper end of the plunger rod 12 may be connected to an anchor clip 13 by means of a bracket 22, which is substantially identical with the bracket 16. It will be seen from the arrangement described, that the connections, thus provided for attaching the shock absorber to the chasis of a motor vehicle, are sufficiently flexible to permit slight relative movement of the portions of the vehicle structure to which the opposite ends of the shock absorber are connected, without in any way interfering with the efficient performance of the shock absorbing function of the device.

As shown in Fig. 2 of the drawing, the casing 10 comprises an outer tube or cylinder 25, which is secured at one end thereof to the plug 14, and which extends in coaxial spaced relation around an inner tube or working cylinder 26. The working cylinder is also closed at one end thereof by the plug 14, and is provided with a plunger 27, which is carried at the lower end of the rod 12 and adapted to be reciprocated by the latter. The cylinders 25 and 26 are closed at their upper ends or, in other words, at the end thereof opposite the plug 14, by means of a bearing member 28 through which the rod 12 extends. A fluid tight connection may be made between the ends of the cylinders and the plug 14 and bearing member 28 by any suitable means, such as the gaskets 29, provided at the ends of the cylinder 26, and the welds 30 provided at the ends of the cylinder 25.

A body of liquid 32, such as a quantity of light oil, or a suitable anti-freezing solution, is provided in the working cylinder 26 for cooperation with the plunger 27 to retard the movement of the latter and thus produce a shock absorbing or energy dissipating action. Desired retardation of the movement of the plunger 27 is obtained by providing the latter with one or more openings 33 of suitable size, through which some of the liquid is forced upon relative movement between the plunger and cylinder. For regulating the passage of liquid through the plunger, and thereby controlling the shock absorbing effect produced by the device, I provide a valve member 34 which is movable relative to the plunger 27 for cooperation with the openings 33. Although various forms of check valves may be used to accomplish this function, I have devised the simple arrangement shown in Figs. 2 and 3, which is especially efficient in operation. In this arrangement the valve member 34 is constructed in the form of a relatively thin disk of suitable material which surrounds the reduced portions 35 of the plunger rod, and is adapted to be moved thereon toward and away from the plunger by the action of the liquid. This valve member functions substantially in the manner of a check valve, which permits liquid to be forced upwardly through the openings 33 upon downward movement of the plunger 27, the action of the liquid against the valve member causing the latter to be moved away from the plunger. Upon upward movement of the plunger, however, the valve member is moved toward the plunger by the action of the liquid, and tends to close the openings 33. To provide for a restricted flow of fluid through the plunger, upon upward movement of the plunger, I provide the valve member with an orifice 37, which is smaller in diameter than the diameter of one of the openings 33, and the plunger 27 with an annular groove 38 which communicates with the orifice 37 and with the openings 33. It will be seen from this arrangement that as the plunger 27 is moved downwardly in the cylinder 26, fluid flows upwardly relatively freely through the openings 33, but upon upward movement of the plunger 27, the openings 33 are closed by the valve member 34 and the effective area of these openings is reduced to substantially the area of the orifice 37.

From the arrangement, as shown in Fig. 2 of the drawing, it will be noted that as the plunger 27 moves downwardly in the working cylinder 26, more of the rod 12 enters the cylinder, and hence, all of the liquid contained in the cylinder below the plunger at the beginning of the downward movement of the latter cannot be accommodated in the chamber being created above the plunger. Consequently some of this liquid must be displaced or discharged from the cylinder. Likewise, it will be seen that upon upward movement of the plunger 27, the rod 12 is retracted from the cylinder, so that the latter is capable of accommodating a greater volume of fluid than when the rod extends thereinto. Accordingly, I provide one or more restricted openings 38', through the wall of the cylinder 26 adjacent the lower end thereof to afford communication between the interior of the working cylinder and the reservoir 39 which surrounds the cylinder. These openings are of suitable cross-sectional area, which may be determined by test or otherwise, to restrict to a desired extent the flow of fluid into and out of the working cylinder as the plunger is moved upwardly and downwardly during the operation of the device. It is pointed out in this connection that the openings 38' are located somewhat below the lower limit of the travel of the plunger and also below the level of the liquid standing in the reservoir 39. In locating these openings below the level of the liquid in the reservoir, the tendency toward emulsification of the fluid in passing into and out of the working cylinder, is eliminated.

As stated above, the efficiency and reliability of a shock absorbing device of this kind is greatly dependent upon the capability of the device to retain a working fluid therein. In the device of my invention, leakage of fluid from the casing is reduced to a negligible amount by a novel sealing structure which will now be described. This novel sealing structure consists in the provision of a suitable gland 40, which cooperates with the bearing member 28 for compressing an annular packing 41 around the plunger rod, and a collecting recess 42 formed in the bearing member inwardly of the packing. This recess may be of any suitable shape, but is preferably formed as an annular groove in the wall of the opening provided in the bearing member for the plunger rod, and communicates with the upper end of the reservoir 39 through the angularly disposed passage 43. Since provision must be made for movement of the plunger rod through the bearing member 28, the opening 44 provided in the latter must be somewhat larger in diameter than the diameter of the rod so as to prevent binding or sticking. Consequently, when the liquid in the working cylinder is subjected to compression by the upward movement of the plunger 27, some of this liquid passes upwardly through the restricted passage extending between the rod 12 and the wall of the opening 44. This fluid leakage is collected by the chamber 42, and is returned to the reservoir through the passage 43. It will thus be seen that the packing 41 is not relied upon as the sole means for sealing the relatively high pressure created in the cylinder by the upward movement of the plunger, and consequently very efficient sealing action is obtained from this packing without the same being tightly compressed against the rod 12, as would otherwise be required.

It is characteristic of a shock absorbing device of this kind that most efficient operation cannot with the plunger, is an emulsified mixture. As is well understood in this art, emulsification of the liquid in the working cylinder is prone to occur whenever air or other gas is present in the cylinder. In the device which I have devised, the quantity of gas present in the working cylinder, and the tendency toward emulsification, are reduced to a minimum by reason of the fact that during the operation of the device, the gas or air which normally collects at the top of the working cylinder, is forced upwardly between the wall of the opening of the bearing member 28 and the rod 12 into the collecting chamber 42, from whence it passes into the upper end of the reservoir 39 through the passage 43.

Suitable means is provided for charging the working cylinder and the reservoir with liquid, such as the opening 45 provided through the wall of the cylinder 25, which opening is adapted to be closed by the plug 46. The exact level of the liquid standing in the reservoir is relatively unimportant, so long as sufficient liquid is available to keep the working cylinder fully charged with unemulsified liquid during the operation of the device.

Although the principle of operation of the device is readily apparent from an inspection of the drawing, it is pointed out briefly that upon downward movement of the plunger within the working cylinder some of the liquid is forced upwardly through the openings of the plunger, and at the same time a volume of liquid corresponding with the displacement of that portion of the rod 12 which projects into the cylinder, is forced through the restricted openings 38' into the reservoir. The cross-sectional area of the openings 38', and of the openings 33, largely determine the resistance which the liquid offers to the downward movement of the plunger. Upon upward movement of the plunger, and withdrawal of the rod 12 from the cylinder, liquid is forced downwardly through the orifice 37 of the valve member, and at the same time there is a tendency to create a partial vacuum in the cylinder below the piston, which causes liquid to flow into the cylinder through the openings 38' from the reservoir 39. The retardation of the movement of the plunger 27 by the liquid thus produces the desired shock absorbing effect.

In Figs. 1 and 2 of the drawing, my shock absorbing device is shown installed on the chassis of a motor vehicle in its most effective position, that is, with its axis extending in substantially the same direction as that in which the force to be absorbed acts. The device may be installed in this position wherever maximum effectiveness is desired, or where sufficient space is available, such as when the device is applied to the front axle of a motor vehicle, as illustrated in Figs. 1 and 2. In some instances, however, where only limited space is available, it may be desirable to install the device in an inclined position, such as that shown in Figs. 4 and 5, wherein the lower end of the cylinder 50 is operably connected to the housing of the rear axle 51, and the upper end of the plunger rod 52 is connected to an anchor clip 53, which is secured to the frame member 54. When the device is installed in this inclined position it will be understood, of course, that the force being absorbed corresponds to the resultant of certain force components instead of being a normally acting force. Accordingly, when the device is installed in this inclined position, the cross-sectional area of the various fluid passages is suitably proportioned according to the amount of plunger retardation required.

It will now be readily seen that I have provided a direct acting shock absorbing device, which is of relatively simple construction, but which is especially reliable and efficient in operation. In my shock absorbing device, as herein disclosed, it will also be seen that my novel fluid retaining means results in leakage being reduced to a minimum, and this efficient retaining means coupled with provision of a reservoir containing a replenishing supply of fluid, enables the device to render efficient and reliable service throughout a long period of usage. Moreover, it will be seen that my device is especially efficient in operation, because gas, which is usually present in varying amounts in shock absorbers of this type, is automatically discharged from the cylinder during normal operation, so that the tendency toward emulsification of the liquid is greatly reduced. Furthermore, my device represents a compact construction, wherein the reservoir surrounds the working cylinder, and is capable of functioning as a displacement chamber as well as a means for replenishing the supply of liquid in the cylinder.

While I have illustrated and described the device of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention what I claim as new is:

1. In a device of the character described the combination of a cylinder, a plunger in said cylinder dividing the latter into two chambers, said cylinder and plunger being relatively movable, fluid in said chamber, said plunger being provided with a passage for a restricted flow of fluid past the plunger in one direction and with means for reducing the effective area of said passage for a more restricted flow of fluid past the plunger in the opposite direction, and a reservoir having restricted communication with one only of said chambers and being otherwise substantially fluid-tight, said restricted communication being effective for a transfer of fluid between the reservoir and such one chamber during relative movement between the cylinder and plunger in either direction.

2. In a device of the character described the combination of a cylinder, a plunger reciprocably movable in said cylinder and dividing the latter into two chambers, fluid in said chambers, said plunger being provided with a passage affording a restricted flow of fluid past said plunger upon movement of the latter in one direction and means for reducing the effective area of said passage for a more restricted flow of fluid past said plunger upon movement of the plunger in the opposite direction, and a reservoir disposed around said cylinder and having restricted working communication with one only of said chambers.

3. In a device of the character described the combination of a cylinder, a plunger reciprocably movable in said cylinder and dividing the latter into two chambers, a reservoir disposed around said cylinder, means affording restricted working communication between said reservoir and one only of said chambers, fluid in said reservoir and said chambers, said plunger being provided with a passage affording a restricted flow of fluid from one of said chambers to the other upon movement of the plunger toward the first mentioned means, and means for reducing the effective area of the plunger passage for a more restricted flow of fluid between said chambers upon movement of said plunger in a direction away from the first mentioned means.

4. In a shock absorber the combination of a cylinder closed at one end thereof, a reservoir having a permanently open restricted communicating connection with said cylinder adjacent the other end of the latter, fluid in said cylinder and reservoir, and a plunger operable in said cylinder between said closed end and said restricted connection and having means providing for a restricted flow of fluid past the plunger on movement of the same toward said connection and a more restricted flow past the plunger on movement of the same in the opposite direction.

5. In a shock absorber the combination of a cylinder closed at one end thereof, a reservoir having restricted communicating connection with said cylinder adjacent the other end of the latter, fluid in said cylinder and reservoir, and a plunger operable in said cylinder between said closed end and said restricted connection and having means providing for a restricted flow of fluid past the plunger on movement of the same toward said connection and a more restricted flow past the plunger on movement of the same toward said closed end.

6. In a shock absorber the combination of a cylinder having closure means at the ends thereof, a plunger operable in said cylinder and having an actuating rod extending through the closure means at one end of the cylinder, a reservoir having restricted communicating connection with said cylinder substantially at the other end thereof, fluid in said reservoir and cylinder for cooperation with said plunger for retarding movement of the latter in both directions in the cylinder, and flow control means carried by the plunger providing for a restricted flow of fluid past the same during movement of the plunger in one direction and a more restricted flow of fluid past the plunger during movement thereof in the opposite direction.

7. In a shock absorber the combination of a cylinder closed at one end thereof, a reservoir having restricted communicating connection with said cylinder adjacent the other end of the latter, a plunger in said cylinder and having an actuating rod extending into the cylinder through said closed end, fluid in said cylinder and reservoir, means at the closed end of the cylinder for returning to said reservoir fluid leaking past said rod, and flow control means carried by said plunger providing for a restricted flow of fluid past the plunger during movement of the same toward said connection and a more restricted flow of fluid past the plunger during movement of the same toward said closed end.

8. In a shock absorber the combination of a cylinder, a reservoir having restricted communicating connection with the cylinder substantially at one end thereof, said cylinder being closed at the other end and being substantially fluid tight except for its connection with the reservoir, a plunger movable in said cylinder, fluid in said reservoir and cylinder for cooperation with said plunger for retarding movement of the latter in both directions, and flow control means carried by said plunger providing for a restricted flow of fluid past the same during movement of the plunger toward said connection and a more restricted flow of fluid past the plunger during movement thereof toward said closed end, said restricted communicating connection being permanently open and having substantially the same effective cross sectional area throughout the permissible travel of the plunger in moving toward said connection.

9. In a shock absorber the combination of an elongated cylinder, a reservoir disposed around said cylinder and having restricted communicating connection with the cylinder substantially at one end thereof, said cylinder being substantially fluid tight except for its connection with the reservoir, a plunger movable in said cylinder, fluid in said reservoir and cylinder for cooperation with said plunger for retarding movement of the latter in both directions, and flow control means carried by said plunger providing for a restricted flow of fluid past the same during movement of the plunger in one direction and a more restricted flow of fluid past the plunger during movement thereof in the opposite direction.

10. In a shock absorber the combination of an elongated cylinder, a reservoir disposed around said cylinder and having restricted communicating connection with the cylinder substantially at one end thereof, said cylinder being substantially fluid tight except for its connection with the reservoir, a plunger movable in said cylinder and having an actuating rod extending into the cylinder at one end thereof, fluid in said cylinder and reservoir for cooperation with the plunger for retarding movement of the latter in both directions, means at said one end of the cylinder for returning to said reservoir fluid leaking past said rod, and flow control means carried by said plunger providing for a restricted flow of fluid past the plunger during movement of the same toward said connection and a more restricted flow of fluid past the plunger during movement thereof toward said one end.

JOSEPH E. PADGETT.